No. 733,067. PATENTED JULY 7, 1903.
E. MICHAUD & E. J. BRICKER.
BELT CONTROLLER.
APPLICATION FILED JULY 23, 1902.
NO MODEL. 2 SHEETS—SHEET 1.
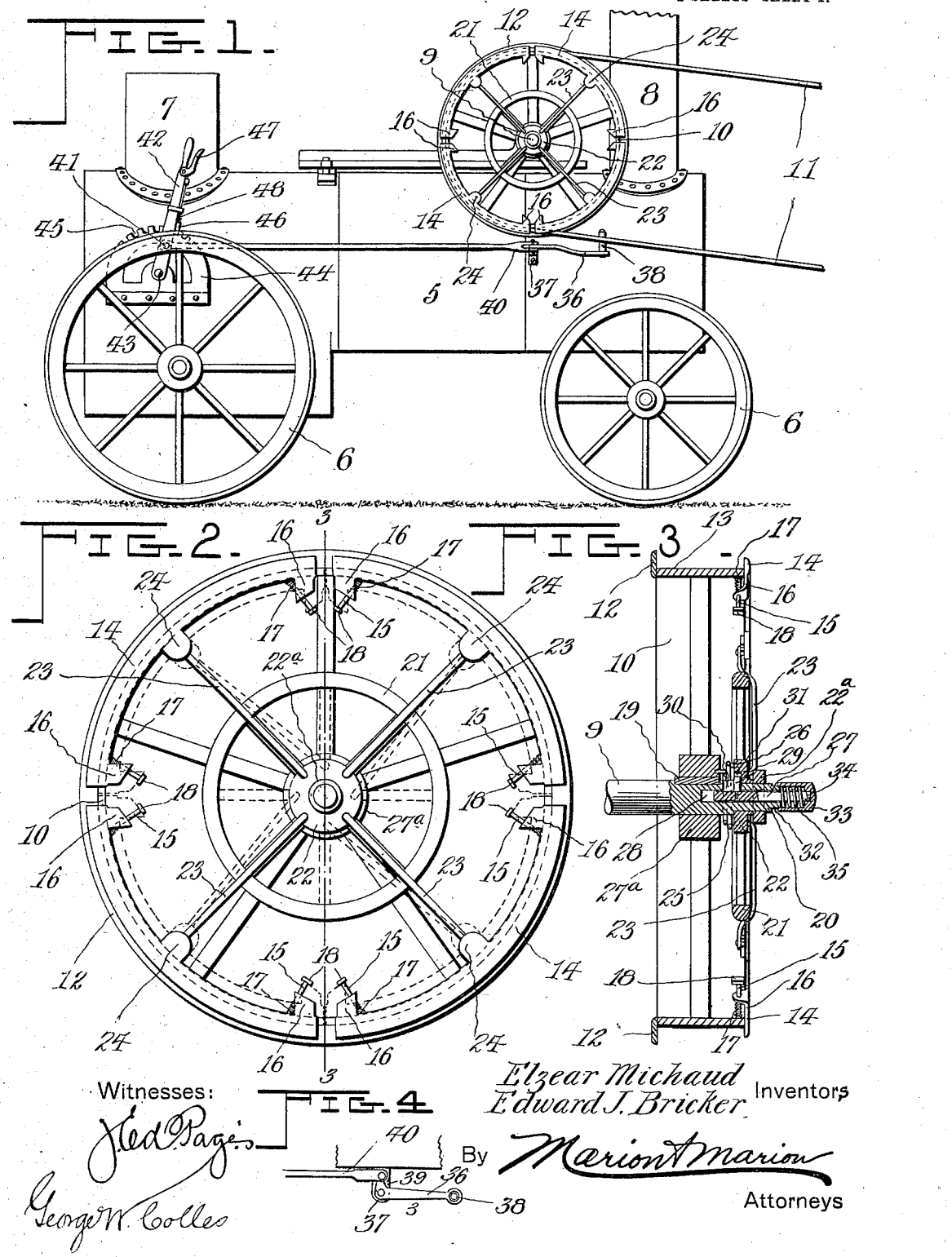
Witnesses:
Hed Page
George W. Colles
Inventors
Elzear Michaud
Edward J. Bricker
By Marion & Marion
Attorneys

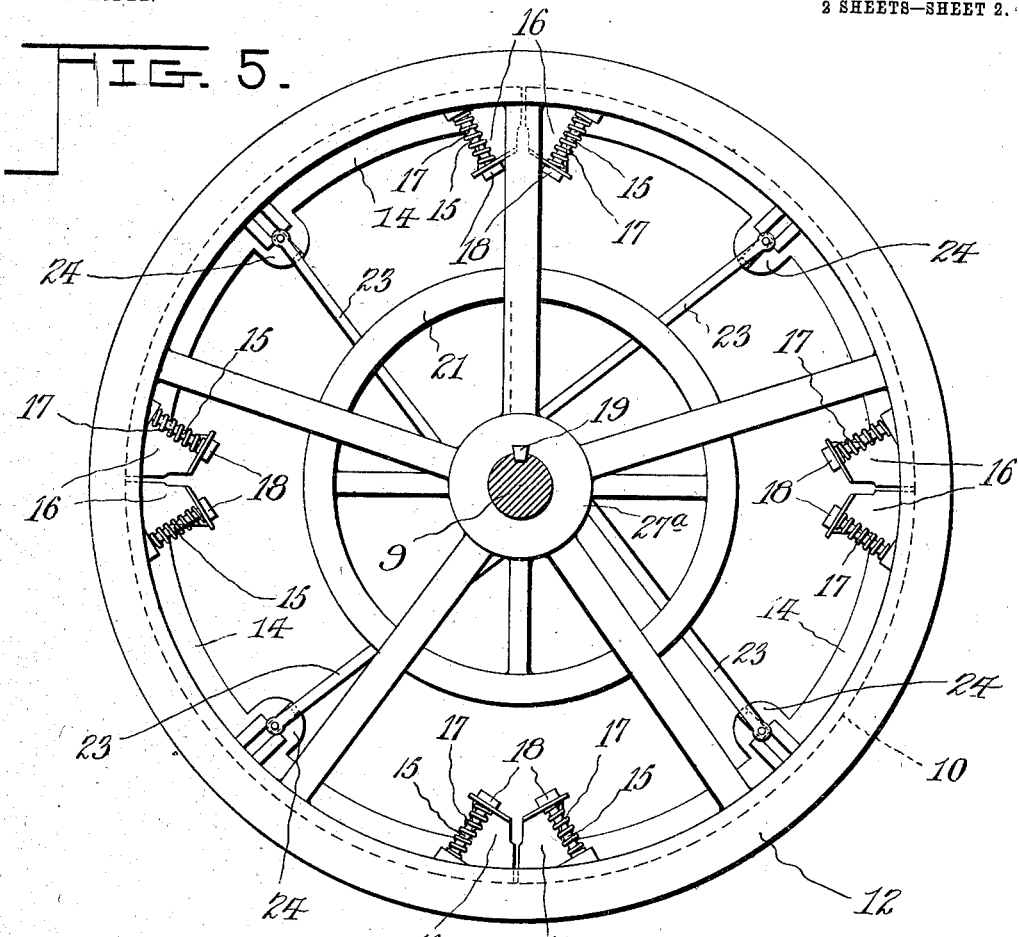
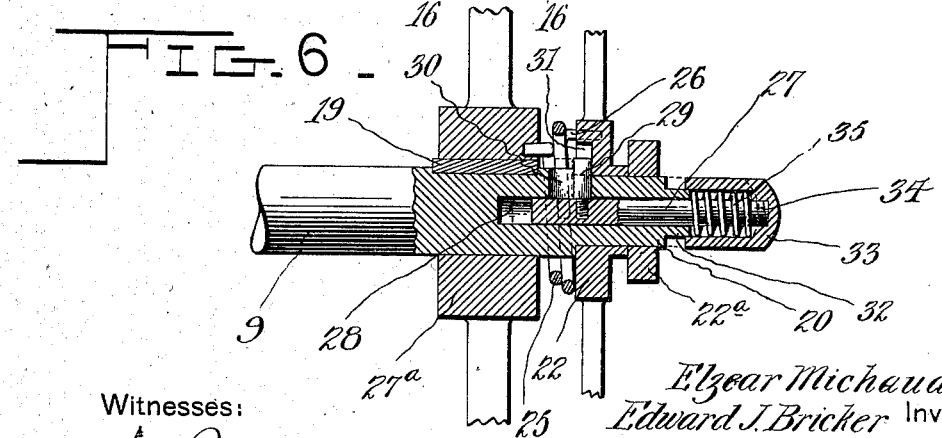

No. 733,067. Patented July 7, 1903.

UNITED STATES PATENT OFFICE.

ELZEAR MICHAUD AND EDWARD JOSEPH BRICKER, OF WINNIPEG, CANADA.

BELT-CONTROLLER.

SPECIFICATION forming part of Letters Patent No. 733,067, dated July 7, 1903.

Application filed July 23, 1902. Serial No. 116,615. (No model.)

*To all whom it may concern:*

Be it known that we, ELZEAR MICHAUD and EDWARD JOSEPH BRICKER, subjects of His Majesty the King of Great Britain, residing at Winnipeg, county of Selkirk, Province of Manitoba, Canada, have invented certain new and useful Improvements in Belt-Controllers; and we do hereby declare that the following is a full, clear, and exact description of the invention, such as will enable others skilled in the art to which it appertains to make and use the same.

Our invention relates to an improved mechanism for controlling belts which serve to connect two pulleys, reference being had especially to the belts which pass over the main pulleys of agricultural engines and serve to connect them to threshing or other machines which it is desired to run from these engines, although it will be understood that our improved belt-controller is equally applicable to pulleys in other locations.

The object of our invention is to correct a defect which is very common in the case of agricultural engines by reason of their exposure to the weather, which in rainy, snowy, or sleety weather causes the main pulley of the engine either to become actually covered with a coating of ice or to become wet or slippery, so that it refuses to transmit the power to the belt properly and throws it off the pulley. Our invention is intended to overcome this difficulty by maintaining the belt in proper position on the pulley, while at the same time permitting the belt to be removed at any time while the engine is running.

To this and other ends our invention consists, primarily, in a divided flange which is placed laterally against one edge of the pulley-rim and is expansible—that is to say, the sections are adapted to be thrust outwardly apart from one another, so as to project beyond the rim of the pulley, and thereby prevent the belt from coming off—and this expansible flange is connected to a hand-wheel at the center, which is so arranged as by a slight turn relative to the pulley to operate the sections simultaneously, so as to cause them to be withdrawn or projected. The hand-wheel itself revolves with the pulley, and when the sections have once been set up or projected, so as to maintain the belt on the pulley, the hub of the hand-wheel is arranged to be caught by a latch-bolt, so as to hold the sections of the expansible flange during the revolution of the wheel. Moreover, we arrange the latch-bolt at the center of the wheel-shaft, so that it may be operated during the motion of the pulley, and by retracting this bolt by a simple push at the end of the shaft the expansible flange is sprung back again, so that the belt may be easily removed.

Our invention further consists in the construction and combination of parts hereinafter more particularly described, and pointed out in the claims.

We have shown in the accompanying drawings the most approved form of our invention and the method of operating the same, and wherein—

Figure 1 is a side elevation of an agricultural engine provided with our improved belt-controller. Fig. 2 is a side elevation of the main pulley provided with the controller. Fig. 3 is a central cross-section through the pulley, taken on the line 3 3 of Fig. 2. Fig. 4 is a plan view of the belt-throwing lever. Fig. 5 is a side elevation of the pulley from the inner side. Fig. 6 is an enlarged detail view of the end of the shaft and the mechanism mounted thereon and forming a part of our invention.

The same numerals of reference denote like parts in each of the figures of the drawings.

Referring first to Fig. 1, the numeral 5 designates the boiler of an agricultural engine, which is mounted upon wheels 6 and has a dome 7 and a stack 8. This, it will be understood, is merely shown by way of illustration of the type of machine on which our controller is ordinarily provided.

9 is the main shaft of the engine, and 10 the pulley mounted thereon, which is adapted to drive threshing or other machinery by means of a belt 11. We provide the pulley 10 on its inner side with a radial flange 12, which is continuous and fixed so as to project beyond the rim 13 of the pulley, and thereby prevents the belt from any possible slipping off on the inside of the rim. The outside of the rim is provided with a sectional expansible flange 14, which forms the main and essential element of our invention, and, as herein shown, is in four sections, each of them being readily adjustable and mounted at its ends on a pair of bolts 15, which are embedded in the interior of the rim of the pulley and project in a direction parallel to the central radius of the section 14. Each section 14 has at its ends a pair of perforated ears 16, through which the bolts 15 pass, and between the ears 16 and the rim of the pulley are mounted coiled springs 17, which press inwardly upon the ears and cause the sections 14 to be held normally retracted beneath the rim 13 of the pulley, as shown by the dotted lines in Fig. 2. The bolts 15 are provided with flanged heads 18, which limit the inward motion of the sections. Of course it will be understood that while four sections are herein shown this is merely by way of example, for in some cases we construct the expansible flange in two, three, or a different number of sections.

The main shaft 9, to which the pulley 10 is secured—as, for instance, by a key 19—is projected beyond the hub of the pulley and somewhat reduced, as shown at 20, to form a mounting for a hand-wheel 21, which turns loosely on the shaft 9. This hand-wheel has a hub 22, secured against endwise movement on the shaft by a collar 22$^a$ and provided with a series of perforations around its periphery, in which are mounted the ends of a series of radial bars or links 23, whose other ends are pivoted to a series of ears 24, which extend inwardly from the center of each of the sections 14. The length of the links 23 is such that when they are in radial line with the shaft, as shown in full lines in Fig. 2, the sections 14 of the expansible flange are pushed outwardly beyond the rim 13, and thereby the belt is maintained against slipping off the pulley on the outside. When, however, the hand-wheel 21 is turned through an angle of forty-five degrees, the links 23 are drawn inwardly, so as to permit the sections 14 of the flange to be retracted, and thereupon the belt 11 may be readily removed by the means hereinafter to be described. In order to assist the movement and operation of the hand-wheel, we provide a spiral or helical spring 25, which is secured at one end, as shown at 26, to the interior side of the hub 22, while the other end is bent and projected either into a hole in the shaft or in the hub 27$^a$ of the pulley 10. This spring is so arranged as to twist the hand-wheel normally, so as to withdraw the links 23 into the position shown in dotted lines. In order now to maintain the sections 14 of the flange when extended, we provide a reciprocating bolt 27, which is mounted in an axially-bored aperture 28 in the end of the shaft, and this bolt has at one point thereof a transverse latch-pin 29, screwed thereinto and extending through a radial slot 30 in the shaft, which communicates with the bore 28, as shown in Fig. 3. The latch-pin 29 extends somewhat beyond the reduced portion 20 of the shaft, so as to catch in a notch 31, which is formed on the inside of the hub 22 of the hand-wheel. Moreover, the end of the shaft beyond the reduced portion 20 is again reduced, as shown at 32, and over this threaded end is mounted a cap 33, into the head of which is screwed on the inside the threaded end 34 of the bolt 27. Within the cap 33 is mounted a coiled spring 35, surrounding the bolt 27 and pressing at one end against the head of the cap and at the other end against the end of the shaft, so as to draw the bolt 27 resiliently outwardly, and the bolt and cap thus have together a short reciprocating movement with respect to the shaft. It will be seen, therefore, that from this arrangement as soon as the notch 31 registers with the pin 29 the latter will drop thereinto and hold the hand-wheel against motion relatively to the pulley, and the notch 31 is so placed that this will occur when in the position shown in Figs. 2 and 3, thus maintaining the sections of the flange in extended position.

The operation of the device as thus far described is as follows: The belt 11 having been placed on the pulley and the engine being at rest or brought down to a sufficiently slow speed, the hand-wheel 21 is given a left-handed twist, so as to extend the sections 14 of the flange and cause the pin 29 to drop into the notch 31, whereupon the engine may now be run at full speed without danger of the belt being thrown off, and this difficulty, which has heretofore been inherent in this type of engine, is thereby practically avoided, because a short period of normal running will cause the moisture to evaporate or to be rubbed off from the surface of the pulley. Now when it is desired to remove the belt the flange 14 may readily be retracted without stopping or slowing the engine by simply pressing upon the cap 33, so as to replace the latch, whereupon the spring 25 will immediately turn back the hand-wheel and cause the sections of the flange to be retracted beneath the rim of the pulley. In order to enable the belt to be readily thrown off when it is desired to disconnect the engine by the operator from the furnace end of the boiler, we prefer to provide the arrangement illustrated in Figs. 1 and 4. This consists in a belt-throwing lever 36, which is pivoted, as at 37, to the side of the boiler and has at its outer end an upright pivoted roller 38, so positioned as to strike the lower edge of the belt 11 and throw it off. To an inwardly-bent arm 39 of the lever 36 is connected a forked link 40, whose other end is pivoted, as at 41, to a hand-lever 42, pivoted, as at 43, to a quadrant-frame 44, which is secured by any suitable means to the side of the boiler. This frame 44 is semicircular in shape and has a series of peripheral notches 45, in which engages a latch-bolt 46, operated by a handle 47 and a spring 48, surrounding the bolt. By pressing upon the handle 47 the lever 42 is released from the quadrant and may be pushed from the operator, which causes the belt-throwing lever 36 to be pushed outwardly, and thus to push the belt 11 off the pulley.

While we have shown in the accompanying drawings the preferred form of our invention, it will be understood that we do not limit ourselves to the precise form shown, for many of the details may be changed in form or position without affecting the operativeness or utility of our invention, and we therefore reserve the right to make all such modifications as are included within the scope of the following claims or of mechanical equivalents to the structures set forth.

Having thus described our invention, what we claim as new, and desire to secure by Letters Patent, is—

1. A belt-controller comprising a pulley, a fixed flange on one side thereof, an expansible flange on the opposite side of the pulley, and means for withdrawing and extending said expansible flange beyond the rim of the pulley.

2. A belt-controller comprising a pulley, a series of flange-sections mounted at one edge of the rim thereof so as to be radially adjustable, and means for radially adjusting said sections toward and from the center of the pulley so as to project beyond and be retracted beneath the rim thereof.

3. A belt-controller comprising a pulley, a series of flange-sections mounted adjacent to one edge thereof so as to be moved radially toward and from the center of said pulley, a hub pivotally mounted at the center of the pulley, and a series of links connecting said sections with said hub.

4. A belt-controller comprising a pulley, a series of flange-sections mounted adjacent to one edge thereof, so as to be moved radially toward and from the center of said pulley, a hub pivotally mounted at the center of the pulley, a series of links connecting said sections with said hub, and a series of springs acting on said sections to cause them to be normally retracted.

5. A belt-controller comprising a pulley, a series of flange-sections mounted adjacent to one edge thereof so as to be moved radially toward and from the center of said pulley, a hub pivotally mounted at the center of the pulley, a series of links connecting said sections with said hub, a series of springs acting on said sections to cause them to be normally retracted, and a latch-bolt adapted to catch in said hub to hold said flange-sections in extended position.

6. A belt-controller comprising a pulley, a hub loosely mounted at the center thereof, a bolt mounted in an axial recess in the shaft, a latch-pin extending radially from said bolt through a radial slot in said shaft and adapted to coact with a notch in the side of the hub, a series of flange-sections mounted adjacent to one rim of the pulley, and a series of links connecting the respective flange-sections to the hub.

7. A belt-controller comprising a pulley, a hub loosely mounted at the center thereof, a bolt mounted in an axial recess in the shaft, a latch-pin extending radially from said bolt through a radial slot in said shaft and adapted to coact with a notch in the side of the hub, a series of flange-sections mounted adjacent to one rim of the pulley, a series of links connecting the respective flange-sections to the hub, and a torsion-spring surrounding the shaft and connecting the latter to said movable hub and acting to hold the flange-sections in retracted position.

8. A belt-controller comprising a pulley, a hub loosely mounted at the center thereof, a bolt mounted in an axial recess in the shaft, a latch-pin extending radially from said bolt through a radial slot in said shaft and adapted to coact with a notch in the side of the hub, a series of flange-sections mounted adjacent to one edge of the rim of the pulley, a series of links connecting the respective flange-sections to the hub, a torsion-spring surrounding the shaft and connecting the latter to said movable hub and acting to hold the flange-sections in retracted position, and a series of compression-springs acting on the ends of said flange-sections to push them normally into retracted position.

9. A belt-controller comprising a pulley, a series of flange-sections mounted adjacent to one edge of the rim thereof so as to be radially adjustable, a hub loosely mounted coaxially with said pulley and having a notch therein, a series of links connecting the respective flange-sections to said hub, a spring acting to turn said hub so as to hold said flange-sections in retracted position, a latch-bolt axially mounted in the shaft and coacting with said notch and extending outwardly through the end of the shaft, and a spring acting on said latch-bolt to push it outwardly so as to cause it to engage with said notch, whereby by pressing upon said bolt said hub is released and the flange-sections caused to fly back into retracted position.

10. A belt-controller comprising a pulley, a series of inwardly-projecting bolts mounted on the inner side of the rim thereof, a series of flange-sections mounted adjacent to the rim of the pulley and having ears slidably mounted on said bolts, a series of coiled springs pressing against said ears and against the rim of the pulley, whereby to retract said flange-sections, a hand-wheel having a hub loosely mounted on the end of the shaft on which the pulley is mounted, said hub of the hand-wheel having a notch on the inner face thereof, a series of links connecting the several flange-sections at their centers to the hub of the hand-wheel, a torsion-spring surrounding the shaft between the hand-wheel and pulley and attached at one end to the shaft and at the other end to the hand-wheel hub, a bolt reciprocably mounted in an axial recess in the end of the shaft, a latch-pin extending radially from the side of said bolt and reciprocating in a radial slot in the shaft and adapted to register with the notch in said hand-wheel hub, a cap mounted on the outwardly-extending end of said bolt and sliding on the end of the shaft, and a coiled spring surrounding the end of said latch-bolt within the cap and pressing against the end of the shaft, substantially as described.

In witness whereof we have hereunto set our hands in the presence of two witnesses.

ELZEAR MICHAUD.
EDWARD JOSEPH BRICKER.

Witnesses:
E. M. MIDGLEY,
ERNEST F. LEECH.